(12) United States Patent
Sekimoto

(10) Patent No.: US 12,111,629 B2
(45) Date of Patent: Oct. 8, 2024

(54) CONTROL DEVICE

(71) Applicant: OMRON Corporation, Kyoto (JP)

(72) Inventor: Hidehiko Sekimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 368 days.

(21) Appl. No.: 17/629,539

(22) PCT Filed: Feb. 21, 2020

(86) PCT No.: PCT/JP2020/007163
§ 371 (c)(1),
(2) Date: Jan. 24, 2022

(87) PCT Pub. No.: WO2021/024523
PCT Pub. Date: Feb. 11, 2021

(65) Prior Publication Data
US 2022/0269238 A1 Aug. 25, 2022

(30) Foreign Application Priority Data
Aug. 7, 2019 (JP) .................. 2019-145127

(51) Int. Cl.
*G05B 19/05* (2006.01)
(52) U.S. Cl.
CPC .......... *G05B 19/054* (2013.01); *G05B 19/052* (2013.01); *G05B 2219/1214* (2013.01); *G05B 2219/15039* (2013.01)
(58) Field of Classification Search
CPC ................ G05B 19/054; G05B 19/052; G05B 2219/1214; G05B 2219/15039;
(Continued)

(56) References Cited

U.S. PATENT DOCUMENTS 7,330,777 B2 * 2/2008 Hashimoto .......... H04J 3/0667
700/262
9,046,890 B2 6/2015 Krause et al.
(Continued)

FOREIGN PATENT DOCUMENTS

CN 105024777 A 11/2015
CN 109507980 A 3/2019
(Continued)

OTHER PUBLICATIONS

Extended European Search Report issued in European Appln. No. 20851183.2 mailed Jun. 2, 2023.
(Continued)

*Primary Examiner* — Christopher W Carter
(74) *Attorney, Agent, or Firm* — ROSSI, KIMMS & McDOWELL LLP

(57) ABSTRACT

To cause multiple field devices to operate together in coordination in accordance with a predetermined program through a network allowing periodic communication, a control device includes an estimator that calculates, based on a position of a first field device in a first cycle, a position of the first field device operable in accordance with a first program in a second cycle following the first cycle, and a processor that determines, based on the first program, a first command value to cause the first field device to operate, transmits the first command value to the first field device through an interface allowing communication with the field devices, determines, based on the estimated position and a second program, a second command value to cause a second field device to operate in coordination with the first field device, and transmits the second command value to the second field device through the interface.

7 Claims, 6 Drawing Sheets

(58) Field of Classification Search
CPC ............ G05B 19/41815; G05B 19/056; G05B 2219/25428; G05B 2219/33213; G05B 2219/34402; B25J 9/1682
See application file for complete search history.

(56) References Cited

U.S. PATENT DOCUMENTS

| | | | |
|---|---|---|---|
| 2004/0199290 | A1 | 10/2004 | Stoddard et al. |
| 2006/0287769 | A1* | 12/2006 | Yanagita ................ B25J 9/1682 700/245 |
| 2014/0005835 | A1 | 1/2014 | Nishiyama |
| 2016/0023355 | A1* | 1/2016 | Komatsu ................ B25J 9/1682 901/8 |
| 2018/0264649 | A1 | 9/2018 | Ojima et al. |
| 2018/0314233 | A1 | 11/2018 | Horiguchi |
| 2019/0049925 | A1 | 2/2019 | Shimamura |
| 2019/0079500 | A1 | 3/2019 | Nakano et al. |
| 2019/0101881 | A1 | 4/2019 | Shimamura et al. |
| 2021/0063989 | A1 | 3/2021 | Taniguchi |
| 2021/0135836 | A1 | 5/2021 | Yoneda |

FOREIGN PATENT DOCUMENTS

| | | |
|---|---|---|
| CN | 109581976 A | 4/2019 |
| JP | 2012194662 A | 10/2012 |
| JP | 2014119904 A | 6/2014 |
| JP | 2018190068 A | 11/2018 |
| JP | 2019036043 A | 3/2019 |
| JP | 2019062288 A | 4/2019 |
| JP | 2019101480 A | 6/2019 |

OTHER PUBLICATIONS

International Search Report issued in Intl. Appln. No. PCT/JP2020/007163 mailed Apr. 14, 2020. English translation provided.
Written Opinion issued in Intl. Appln. No. PCT/JP2020/007163 mailed Apr. 14, 2020. English translation provided.
Office Action issued in Chinese Appln. No. 202080054963.3, mailed Mar. 5, 2024. English translation provided.

* cited by examiner

FIG. 7

| Master device \ Slave device | | Motion shaft or shaft group (No communication delay) | Robot (1 cycle of communication delay) |
|---|---|---|---|
| Motion shaft or shaft group | Instructed position (No communication delay) | None | 1 cycle |
| | Feedback position (1 cycle of communication delay) | 1 cycle | 2 cycles |
| Robot | Instructed position (1 cycle of communication delay) | 1 cycle | 2 cycles |
| | Feedback position (1 cycle of communication delay) | 2 cycles | 3 cycles |

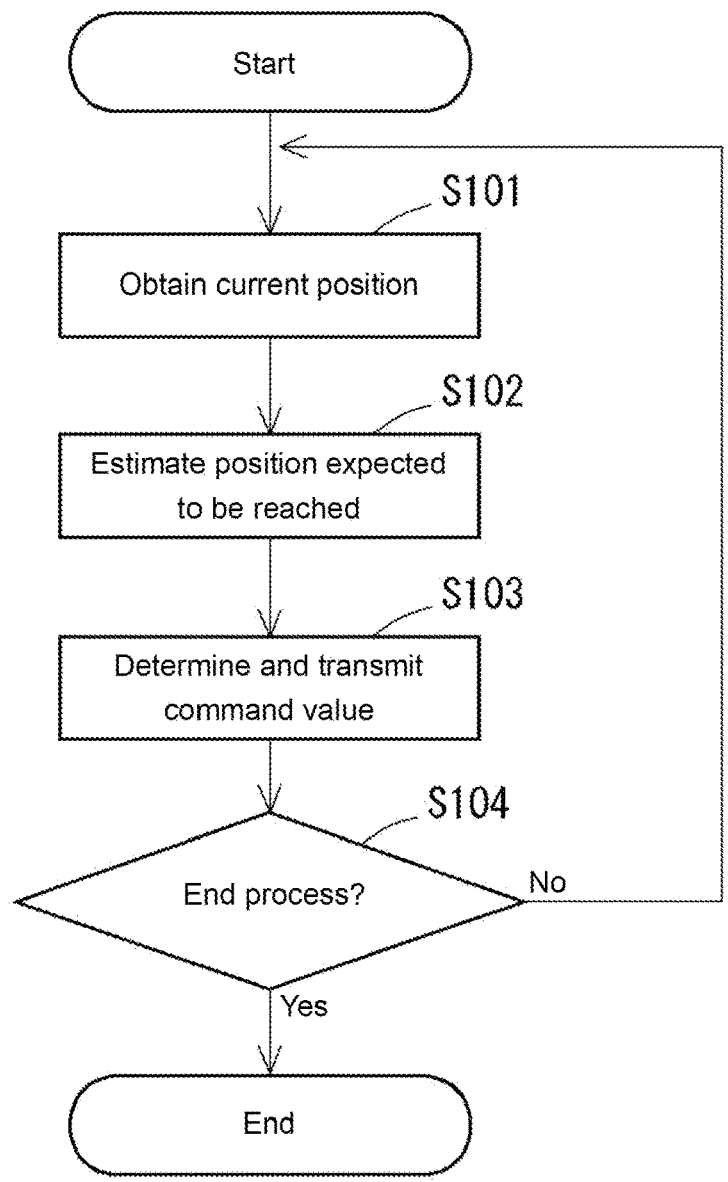

FIG. 8

CONTROL DEVICE

FIELD

The present invention relates to a control device for controlling multiple control targets.

BACKGROUND

Factory automation (FA) techniques using control devices such as programmable logic controllers (PLCs) have been widespread at various production sites. Such a control device may indirectly control, in addition to directly controlling, a control target through another device by providing a control command to the other device. Control systems including multiple dedicated devices are to integrate such devices into fewer control devices. For example, with the technique described in Patent Literature 1, a central processing unit (CPU) module in a PLC executes a motion computation program and a user program in synchronization.

Patent Literature 2 describes a technique for performing control computations in accordance with multiple programs in different execution formats with a single control device. For example, this technique computes command values for a program in one format in which the overall program is executed in every control cycle and for a program in another format in which parts of the program are executed successively in accordance with intermediate codes generated through interpretation of each part of the program. The computed command values are output together in every control cycle.

Patent Literature 3 describes a control device for synchronizing multiple signals that are periodically generated by different clocks. The control device with this technique includes a first processor that obtains a synchronization signal generated in every first cycle, and a second processor that generates second cycles each having a length obtained by dividing the first cycle by n (n≥1), generates, using a timer, a control signal in every third cycle having a length obtained by dividing the second cycle by m (m≥2), and performs predetermined processing at timing based on the control signal. At least one of multiple control signals generated in first cycles is to be synchronized with the synchronization signal. Upon detecting an error in timing between the synchronization signal and the control signal to be synchronized with the synchronization signal, the second processor temporarily changes the timer interval for subsequent cycles to correct the error.

CITATION LIST

Patent Literature

Patent Literature 1: Japanese Unexamined Patent Application Publication No. 2012-194662
Patent Literature 2: Japanese Unexamined Patent Application Publication No. 2019-36043
Patent Literature 3: Japanese Unexamined Patent Application Publication No. 2019-101480

SUMMARY

Technical Problem

For example, a known system may synchronize master-slave operations with a master operation using a rotational shaft in an apparatus that transports containers and a slave operation using a nozzle filling the containers with any filler. Another known system may synchronize master-slave operations with a master operation using a conveyor that transports workpieces and a slave operation using a robot that performs an operation on the workpieces. Such systems involve a user correcting delays in master-slave operations resulting from communication cycles.

In response to the above issue, one or more aspects of the present invention are directed to a technique for easy synchronous control of operations of field devices.

Solution to Problem

A control device according to an aspect of the present invention causes a plurality of field devices to operate in coordination with one another in accordance with a predetermined program through a network allowing periodic communication. The control device includes an estimator that calculates, based on a position of a first field device in a first cycle, a position of the first field device operable in accordance with a first program in a second cycle following the first cycle, and a processor that determines, based on the first program, a first command value to cause the first field device to operate, transmits the first command value to the first field device through an interface allowing communication with the plurality of field devices, determines, based on the position calculated by the estimator and a second program, a second command value to cause a second field device to operate in coordination with the first field device, and transmits the second command value to the second field device through the interface.

When a field device is controlled through a network that allows periodic communication, a delay of cycles taken for processing and communication may occur before the field device receives a command value and performs the operation. In the above control device, the estimator calculates the position of the first field device in a subsequent cycle (second cycle), and the processor determines, based on the calculated position, a command value for an operation of the second field device to operate in coordination with the first field device. In other words, an instruction for the operation of the second field device, which uses the position of the first field device in the subsequent cycle as a target, can accommodate a delay between transmission of the command value and reception of the command value in the second field device. The technique allows easy synchronous control of operations of field devices.

The estimator may calculate the position of the first field device in the second cycle by adding, to the position of the first field device in the first cycle, a value determined by multiplying an operating speed of the first field device by a predetermined correction coefficient. The position of the first field device in the second cycle can be estimated through, for example, the calculation above.

One of the first program or the second program may be in a first execution format in which an overall program is executed at every execution, and another one of the first program or the second program may be in a second execution format in which parts of the program are executed successively. The predetermined correction coefficient may be determined in accordance with a combination of types of the first field device and the second field device, and the combination may include a device operable in accordance with the program in the first execution format and a device operable in accordance with the program in the second execution format. The first execution format is a format in which the overall program is executed at every execution of the program. Examples of such a program include an International Electrotechnical Commission (IEC) program containing instructions for sequence control and motion control. The second execution format is a format in which parts of the program are executed successively. Examples of such a program include an application program for mainly controlling a robot. In this case, the delay varies depending on, for example, whether each of the first field device serving as a reference for coordinated operations and the second field device that operates in coordination with the first field device is a device that operates in the first execution format or a device that operates in the second execution format. Thus, the correction coefficient may be determined in accordance with a combination of the types of first field device and second field device, thus allowing appropriate estimation.

The processor may include a first processor that executes the program in the first execution format in every control cycle in the periodic communication and computes a command value to control one of the plurality of field devices, and a second processor that executes the program in the second execution format and computes a command value to control another of the plurality of field devices in every control cycle in accordance with an intermediate code generated by an interpreter interpreting at least a part of the program in the second program, and also computes the command value to control the other of the plurality of field devices in response to the first processor executing the program in the first execution format. The first processor and the second processor may each transmit the computed command value in every control cycle through the interface.

The first processor and the second processor each transmit a calculated command value in every control cycle in the periodic communication described above, thus allowing integrated control of, for example, a motion shaft and a robot and easy synchronous control of their operations.

The position of the first field device in the first cycle may be a feedback value fed back from the first field device or a command value transmitted to the first field device. The predetermined correction coefficient may be determined in accordance with one of the feedback value or the transmitted command value to be used as the position of the first field device in the first cycle. More specifically, either of the values described above may be used to indicate the position of the first field device in the first cycle. The delay differs for each of the two values. The correction coefficient may thus be determined with one of the two values to be used, thus allowing appropriate estimation.

The periodic communication may include communication in accordance with an EtherCAT (registered trademark) standard. Such a standard allows a field network to perform the processing described above.

Advantageous Effects

The technique according to the above aspects allows easy synchronous control of operations of field devices.

BRIEF DESCRIPTION OF THE DRAWINGS

FIG. 7 is a table describing correction coefficients.

FIG. 8 is a flowchart of an example correction process.

DETAILED DESCRIPTION

Example Use

Figure 1:
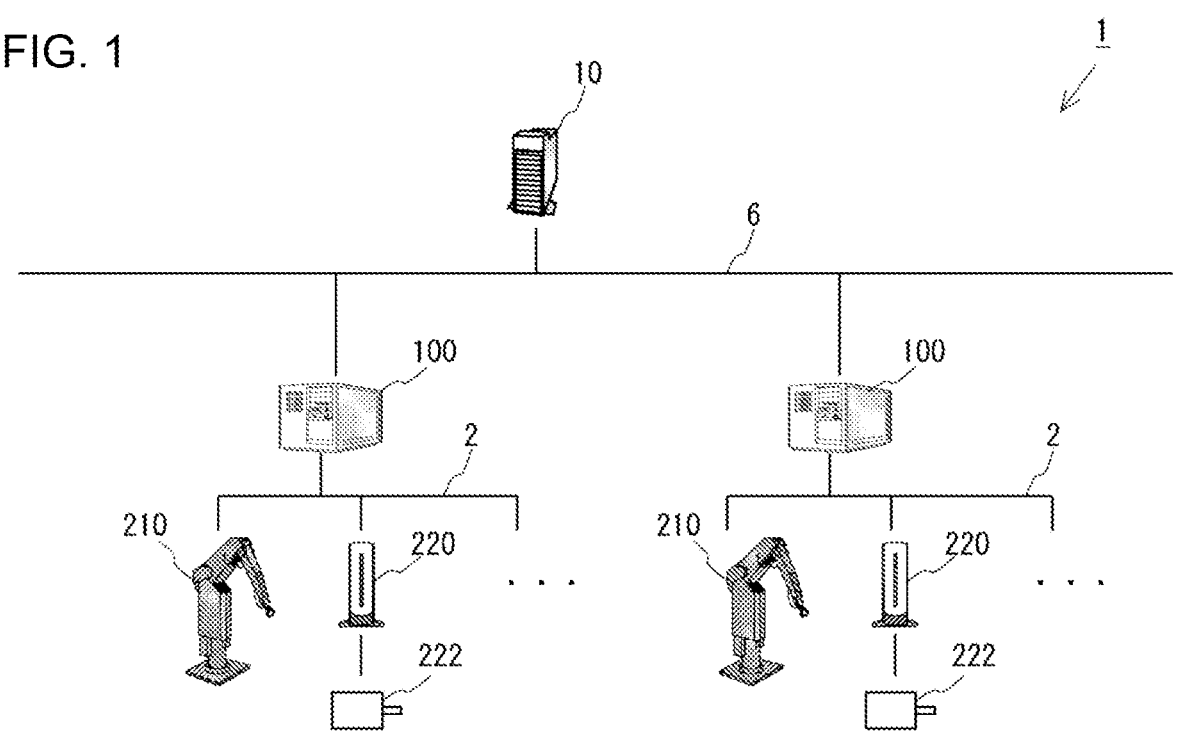
FIG. 1 is a schematic diagram of a control system including integrated controllers.
Figure 2:
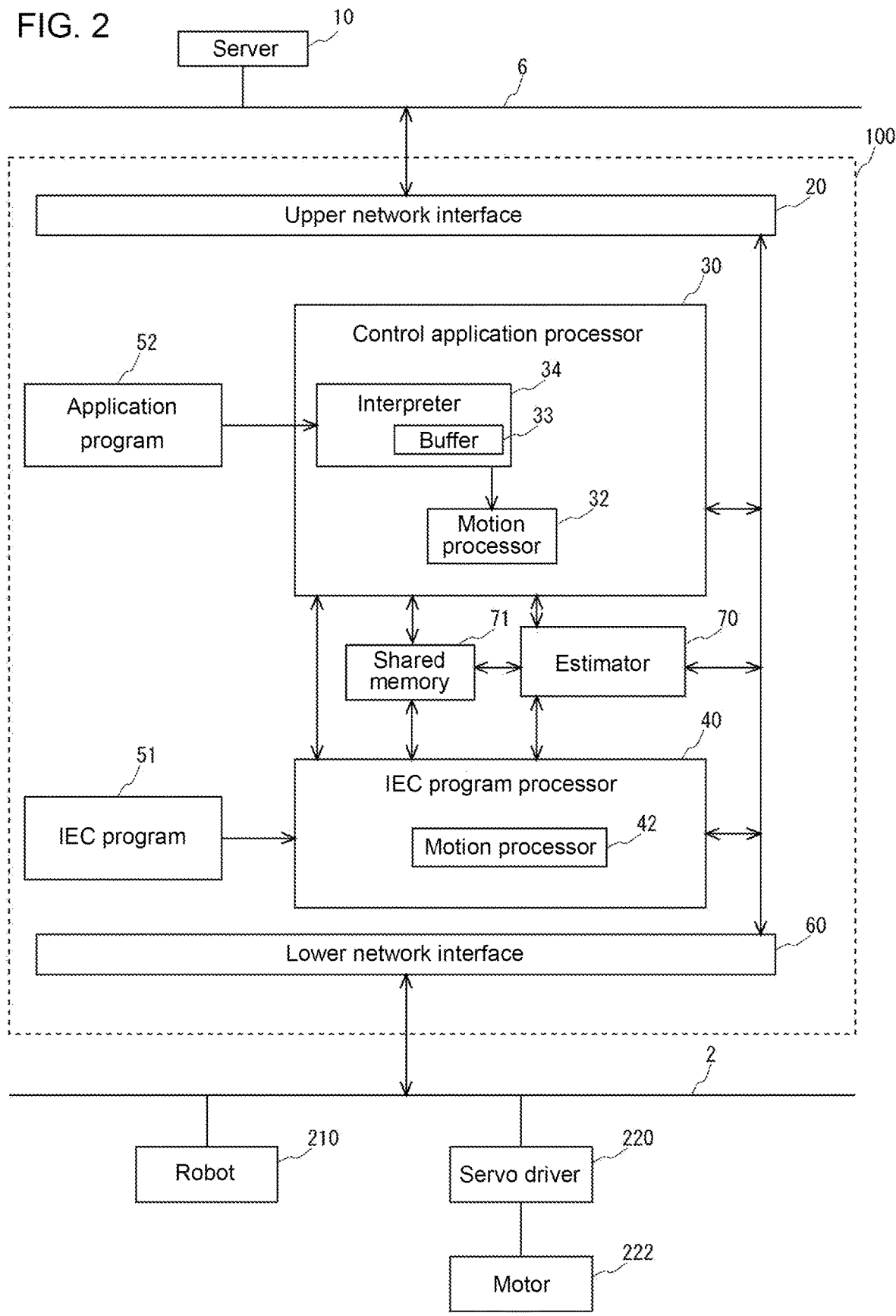
FIG. 2 is a functional block diagram illustrating the functions of an integrated controller.

An example use of a control device according to an embodiment will now be described with reference to FIGS. 1 and 2. FIG. 1 is a schematic diagram of a control system 1 including control devices 100. FIG. 2 is a functional block diagram of a control device 100 including functional units.

The control device 100 corresponds to an industrial controller that controls targets such as various pieces of equipment and apparatuses. The control device 100 is a computer that performs control computations described later. The control device 100 may be connected to field devices with a field network 2. The field devices include, for example, an actuator and an input-output device. The actuator physically acts on a manufacturing apparatus or at a production line (hereafter collectively referred to as a field). The input-output device exchanges information with the field. In FIG. 1, robots 210, servo drivers 220, and motors 222 are examples of the field devices. Each servo driver 220 drives the corresponding motor 222 in accordance with output data (e.g., a command value such as a position command and a speed command) from the corresponding control device 100. Examples of the robots 210 include a parallel robot, a selective compliance assembly robot arm (SCARA) robot, and an articulated robot. The control device 100 can control the corresponding robot 210, servo driver 220, and motor 222 in an integrated manner as described in detail later.

The control device 100 exchanges data with one or more field devices through, for example, the field network 2. Afield network is generally referred to as a fieldbus, but is referred to as a field network herein for simplicity of explanation. The control device 100 collects data (hereafter referred to as input data) collected or generated by various field devices (input process), generates data (hereafter referred to as output data) including commands to the field devices (computation process), and transmits the generated output data to the corresponding field devices (output process).

The field network 2 herein may be a bus or a network that allows periodic communication for on-time arrival of data. Known buses or networks for such periodic communication include Ethernet for Control Automation Technology (EtherCAT) (registered trademark). Data exchanged between the control device 100 and the field devices through the field network 2 is updated in short cycles in the order of several hundreds of microseconds to several tens of milliseconds. Such updating of exchanged data may be referred to as input-output refresh.

The control device 100 is also connected to other devices with an upper network 6. The upper network 6 may use a common network protocol such as Ethernet (registered trademark) and EtherNet/IP (registered trademark). More specifically, one or more servers 10 may be connected to the upper network 6. The server 10 may be, for example, a database system or a manufacturing execution system (MES). The MES obtains information from a control target, such as a manufacturing apparatus or equipment, to monitor and manage the overall production. The MES may also manage other information such as order information, quality information, and shipping information. Devices connected to the upper network 6 are not limited to the above. A device that provides information services may also be connected to the upper network 6.

The structure of the control device 100 will now be described with reference to FIG. 2. As described above, the control device 100 is a computer that performs predetermined control computations. The control device 100 includes a processor and a memory for the control computations. The processor includes, for example, a central processing unit (CPU), a microprocessing unit (MPU), and a graphics processing unit (GPU). The processor may include multiple cores. The control device 100 may include multiple processors. The memory may be, for example, a volatile storage such as a dynamic random-access memory (DRAM) or a static random-access memory (SRAM), or a nonvolatile storage such as a hard disk drive (HDD) or a solid-state drive (SSD). The processor reads various programs stored in the memory and executes the programs to implement control for the control target and various types of processing described later. The memory stores system programs for implementing basic functions and user programs (an IEC program 51 and an application program 52) created specifically for control targets, such as a manufacturing apparatus or a piece of equipment.

In one or more embodiments of the present disclosure, the overall IEC program 51 is scanned at every execution of the program for computing one or more command values at every execution of the program. The IEC program 51 typically includes a program containing one or more instructions written in accordance with the international standard IEC 61131-3 defined by the International Electrotechnical Commission (IEC). The IEC program 51 contains instructions for sequence control and motion control. The IEC program 51 is in an execution format in which the overall program is executed (scanned) in every control cycle, and is thus suitable for control to be performed immediately at high speed. In contrast, the application program 52 in one or more embodiments of the present invention is a control program for a specific process or operation using a robot. The application program 52 includes a program containing one or more instructions to implement a control application using a robot. The application program 52 is basically distinguished from the IEC program 51. In one example, the application program 52 for controlling a robot is an interpreter written in a robot language executed successively line by line.

As shown in FIG. 2, the control device 100 includes an IEC program processor 40, a lower network interface 60, an upper network interface 20, a control application processor 30, an estimator 70, and a shared memory 71. The lower network interface 60 mediates, through the field network 2, data exchange between the IEC program processor 40 and the connected field devices and between the control application processor 30 and the field devices. The upper network interface 20 mediates, through the upper network 6, data exchange between the IEC program processor 40 and the connected server 10 and between the control application processor 30 and the server 10. For example, the control device 100 receives an instruction to start or end production from the server 10 connected with the upper network 6. The server 10 may also transmit, to the control device 100, for example, an application program for operating a control application and recipe information (information about parameters suitable for production).

The IEC program processor 40 executes (scans) the IEC program 51 in every predetermined control cycle and computes one or more command values. In other words, the IEC program processor 40 computes one or more command values in accordance with the IEC program 51 in every control cycle. In one or more embodiments of the present disclosure, the IEC program 51 is executed to control a predetermined apparatus including the motor 222. A motion processor 42 computes a command value in accordance with a motion instruction included in the IEC program 51 in every control cycle. More specifically, the motion instruction included in the IEC program 51 includes an instruction for a motion to continue for multiple control cycles (e.g., an instruction to cause an output from the predetermined apparatus including the motor 222 to indicate a predetermined path). In response to the motion instruction being implemented, the motion processor 42 computes a command value in every control cycle in accordance with the executed motion instruction. In other words, the motion processor 42 outputs a command value to the above predetermined apparatus in every control cycle to cause the motion specified by the motion instruction. The motion processor 42 corresponds to a first processor in an aspect of the present invention.

The control application processor 30 computes a command value for controlling the control application based on, for example, the application program 52 and recipe information. In one or more embodiments of the present disclosure, the control application processor 30 executes the application program 52 to control the robot 210. In synchronization with the computation and output of a command value by the IEC program processor 40, the control application processor 30 computes a command value for the control application and outputs the command value. In other words, the control application processor 30 computes a command value in synchronization with computation performed by the IEC program processor 40. Synchronization of the IEC program processor 40 and the control application processor 30 will be described later. To compute a command value in synchronization with the computation of a command value by the IEC program processor 40, the control application processor 30 includes a motion processor 32, a buffer 33, and an interpreter 34.

The interpreter 34 successively interprets at least a part of the application program 52 and generates an intermediate code. The interpreter 34 includes the buffer 33 that stores the generated intermediate code. The intermediate code in one or more embodiments of the present disclosure includes an instruction for computing a command value in every control cycle, and may include one or more instructions or one or more functions. The motion processor 32 computes a command value in every control cycle in accordance with an intermediate code pre-generated by the interpreter 34 and stored in the buffer 33. An instruction (code) written in the application program 52 is typically executed successively. Thus, the command value may not be computed in cycles. In one or more embodiments of the present disclosure, the intermediate code allows the motion processor 32 to compute the command value in every control cycle. The instruction written in the intermediate code may use a coordinate system in accordance with the control application. The motion processor 32 corresponds to a second processor in an aspect of the present invention. The motion processor 32 and the motion processor 42 each correspond to a processor in an aspect of the present invention.

The control device 100 includes the shared memory 71 for data sharing between the IEC program processor 40 and the control application processor 30. In one or more embodiments of the present disclosure, the shared memory 71 stores a part or all of the results of processing performed by the control application processor 30. The IEC program processor 40 can refer to data stored in the shared memory 71. The IEC program processor 40 may also write data to the shared memory 71. Such data written by the IEC program processor 40 can be referred to by the interpreter 34 and the motion processor 32. The estimator 70 may also write and read data to and from the shared memory 71.

As described above, the motion processor 32 uses the intermediate code generated by the interpreter 34 to control the robot 210. In another embodiment, the motion processor 32 may control the robot 210 in response to execution of the IEC program 51. In this case, the IEC program 51 contains a control command (motion command) for the robot 210. In response to the IEC program processor 40 executing the IEC program 51, the control command for the robot 210 contained in the IEC program 51 is output to the motion processor 32, which then controls the robot 210 based on the control command.

As described above, the control device 100 can control the robot 210 in accordance with both the IEC program 51 and the application program 52 in different execution formats. The control system 1 can thus have a flexible structure to implement a user request based on the characteristics of each program.

The estimator 70 performs estimation for correcting a delay in operations of multiple field devices that are to operate in coordination. For example, based on a value representing the current position or posture of a field device serving as a reference for operations (also referred to as an operation master device), a command value is calculated for an operation of another field device (also referred to as an operation slave device) that is to operate in coordination with the operation master device. At a time point at which the operation slave device performs the operation in accordance with a control command containing the command value, the operation master device may have moved further or may have changed the posture. This delay in an operation can result from a difference in communication cycles or from the time taken for data processing. The estimator 70 thus estimates the position or posture of the operation master device at the time point at which the operation slave device performs the operation. The motion processor 32 and the motion processor 42 transmit, to the operation slave device, command values based on an estimated value. In this manner, the estimator 70 performs lead angle correction to cause the operation slave device to operate earlier than the operation master device. This allows the user of the control device 100 to easily perform synchronous control of operations. The control device 100 controls the master device and the slave device in an integrated manner. More specifically, the control device 100 controls the field devices in accordance with both the IEC program 51 and the application program 52, and thus can control the master device and the slave device in different execution formats in an integrated manner.

Synchronous Execution of Programs

The control device 100 synchronously executes the IEC program 51 and the application program 52. The interpreter 34 in the control application processor 30 successively executes parts of the application program 52 in cycles longer than control cycles, or for example, in every cycle (control application synchronization cycle T2) with a length twice the length of the control cycle. Each of the motion processor 42 in the IEC program processor 40 and the motion processor 32 in the control application processor 30 computes a command value in every control cycle with the same length. Command values are thus synchronously output from the control device 100 in predetermined control cycles. As described above, each of the IEC program processor 40 and the control application processor 30 includes a motion processor for continuously controlling the operation of an actuator. These motion processors synchronously compute command values to perform both control in accordance with the IEC program 51 and control in accordance with the application program 52 in cycles synchronized with control cycles. This allows accurate control in control cycles.

Figure 3:
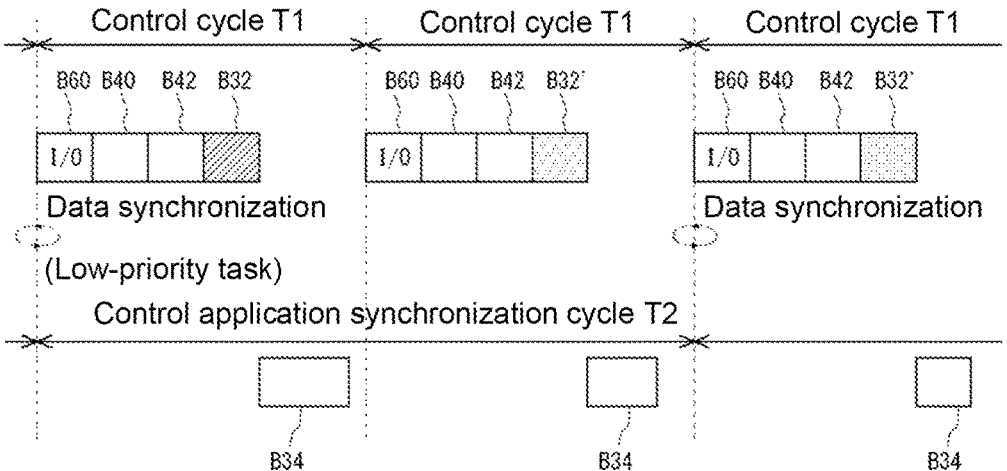
FIG. 3 is a diagram showing the processing performed by the integrated controller in control cycles.

The execution timing of the IEC program 51 and the application program 52 in the control device 100 will now be described in detail with reference to FIG. 3. FIG. 3 is a diagram showing the example timing at which the control device 100 executes programs. For the control device 100, high-priority tasks with a higher priority (tasks in an upper portion of FIG. 3) and a low-priority task with a lower priority (task in a lower portion of FIG. 3) are defined based on processor resources. More specifically, tasks involving the lower network interface 60, execution by the IEC program processor 40 and the motion processor 42, and execution by the motion processor 32 in the control application processor 30 are defined as high-priority tasks, and tasks involving execution by the interpreter 34 in the control application processor 30 are defined as low-priority tasks.

More specifically, high-priority tasks include input-output refresh B60 associated with the lower network interface 60, execution B40 of the IEC program 51, computation B42 of a command value performed by the motion processor 42 in accordance with the IEC program 51, computation B32 of a command value performed by the motion processor 32 in accordance with the application program 52, and computation B32' of a command value performed by the motion processor 32 in response to the IEC program 51. Low-priority tasks include successive interpretation B34 of the application program 52. The high-priority tasks performed in one control cycle T1 include either the computation B32 or the computation B32'.

The high-priority tasks are performed in every predetermined control cycle T1. The low-priority task is performed while the high-priority tasks are not being performed in each control cycle. More specifically, each high-priority task has an allotted time to be performed in every control cycle, whereas the low-priority task is performed at a time other than a time at which any high-priority task is performed.

The high-priority tasks will be described first. At the start of each control cycle, the input-output refresh B60 is performed. The IEC program processor 40 then executes (scans) the overall IEC program 51 to compute one or more command values for sequence control (execution B40). The motion processor 42 also performs motion processing for a motion instruction contained in the IEC program 51 to compute one or more command values for the motion instruction (execution B42). The motion processor 32 in the control application processor 30 then prepares a motion command for controlling the robot 210 in accordance with an intermediate code stored in the buffer 33 (execution B32), or prepares a motion command for controlling the robot 210 contained in the IEC program 51 (execution B32'). Either the execution B32 or the execution B32' is selected based on a predetermined criterion. The same processing is thereafter performed in every control cycle. The motion processor 32 may read the intermediate code from the buffer 33 at any timing that may not be in every control cycle. When the read intermediate code contains an instruction to compute command values for multiple control cycles T1, the intermediate code for the multiple control cycles T1 can be read once.

In this manner, the high-priority tasks are performed in one control cycle, followed by preparation of a set of a command value for sequence control for, for example, the motor 222, a command value for motion control for, for example, the motor 222, and a command value for the control application for the robot 210. These command values are normally output to the field at the start of the next control cycle. More specifically, the IEC program processor 40 and the control application processor 30 compute command values in accordance with input data in the same control cycles. This allows output synchronized with input.

For the low-priority task, the interpreter 34 in the control application processor 30 successively executes parts of the application program 52. More specifically, the interpreter 34 reads and analyzes the application program 52 with a lower priority. The interpreter 34 analyzes the application program 52 to generate intermediate codes, which is successively stored into the buffer 33 based on the capacity of the buffer 33. The intermediate codes stored in the buffer 33 are sequentially referred to by the motion processor 32 in the control application processor 30 to generate a command value in the computation B32. In this case, the interpreter 34 pre-generates extra intermediate codes corresponding to an integral multiple of the control cycle as the computation cycle of the high-priority tasks. This allows computation of a command value for the control application in every control cycle without affecting the processing performed by the motion processor 32.

The interpreter 34 temporarily stops interpreting the application program 52 before the start of a cycle with a predetermined control application synchronization cycle (an integer multiple of the control cycle). At the temporary stop, data synchronization is performed between the IEC program processor 40 and the control application processor 30 to have the two processors sharing consistent data. In this manner, the interpreter 34 updates data shared with the IEC program processor 40 in every synchronization cycle. At the same time with the update of the shared data, input data obtained from the field and output data may also be updated (synchronized). This allows the control application processor 30 to control the robot 210 by using data obtained by the IEC program processor 40. The control application synchronization cycle may have any length that is an integer multiple of the control cycle. The length of the control application synchronization cycle may be set as appropriate depending on, for example, the control accuracy for the control application.

Synchronous Control of Field Devices

Figure 4:
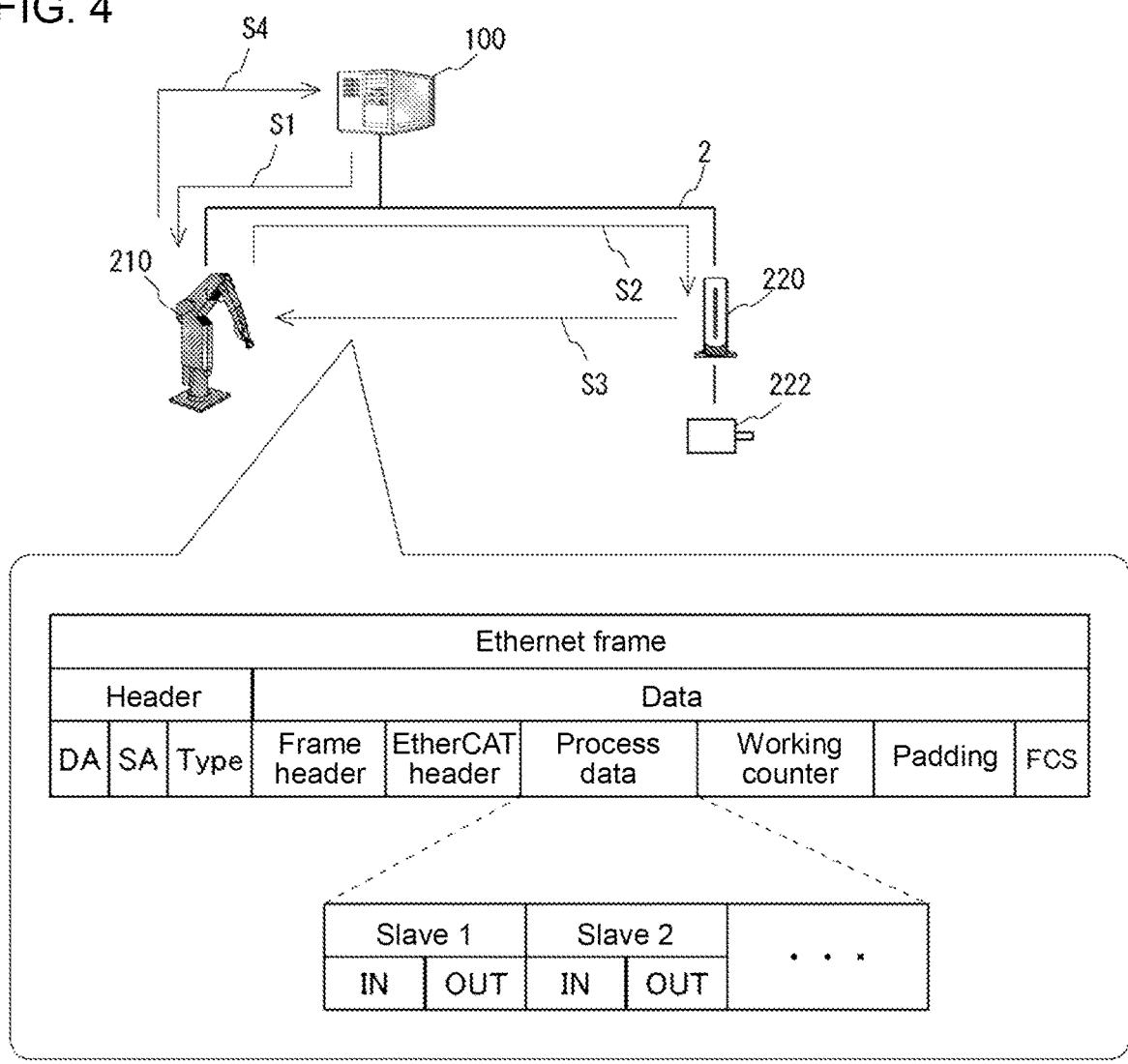
FIG. 4 is a diagram describing example communication between a control device and field devices.

FIG. 4 is a diagram describing example communication between the control device and the field devices. The communication is performed periodically. In the present embodiment, the communication is performed in accordance with the EtherCAT standard. The control device 100 functions as a controller for the field network 2 to control field devices including the robot 210 and the servo driver 220. The devices may be interconnected in a daisy chain, star, or ring topology. In the present embodiment, the devices are daisy-chained. The control device 100 stores information in accordance with a predetermined standard into a data field in an Ethernet frame. The Ethernet frame is then transmitted sequentially to the field devices connected in series (S1 and S2 in FIG. 4). The Ethernet frame turns at a terminal field device to return in the reverse direction to the control device 100 (S3 and S4 in FIG. 4). This ends one cycle of input and output processing. In every cycle, each field device performs, on the fly, input and output processing on an Ethernet frame received and to be transmitted. A bit location and a bit width are predefined for data input or output performed by each field device. The motion processor 32 and the motion processor 42 described above store command values for the field devices into an Ethernet frame in accordance with the application program 52 or the IEC program 51. Command values corrected based on estimation results of the estimator 70 are used as the command values in the above processing.

Figure 5:
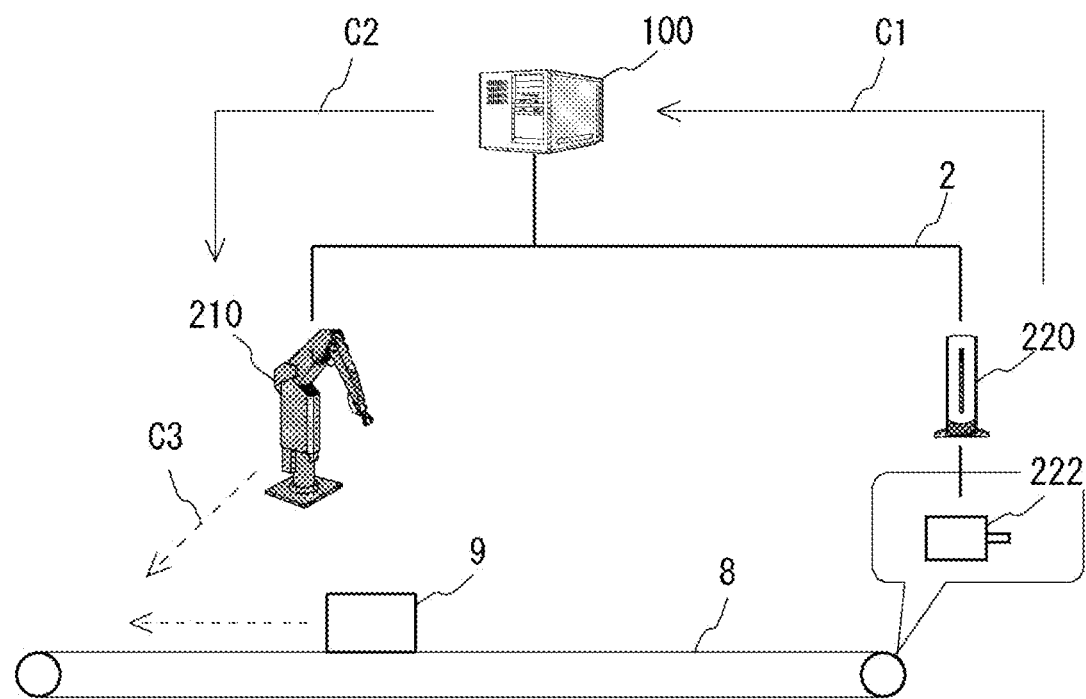
FIG. 5 is a diagram describing example coordinated operations of the field devices.

FIG. 5 is a diagram describing example coordinated operations of the field devices. In the example in FIG. 5, the motor 222 operates a conveyor 8. A workpiece 9 is placed on the conveyor 8 and transported in accordance with the operation of the motor 222. The robot 210 performs a predetermined operation on the workpiece 9.

In a first cycle (C1 in FIG. 5), for example, the servo driver 220 feeds back the position of the shaft of the motor 222 to the control device 100. The operating speed of the motor 222 may also be fed back. In a second cycle (C2 in FIG. 5) following the first cycle, the control device 100 estimates, based on the position of the shaft of the motor 222, the position of the shaft of the motor 222 in a third cycle (C3 in FIG. 5) following the second cycle, determines a target position of the robot 210 based on the estimated position, and transmits a control command based on the target position to the robot 210. In the third cycle, the robot 210 operates based on the target position. In the third cycle, the workpiece 9 is transported by the conveyor 8 to the estimated position ahead of the position in the second cycle. The multiple field devices thus operate synchronously.

Figure 6:
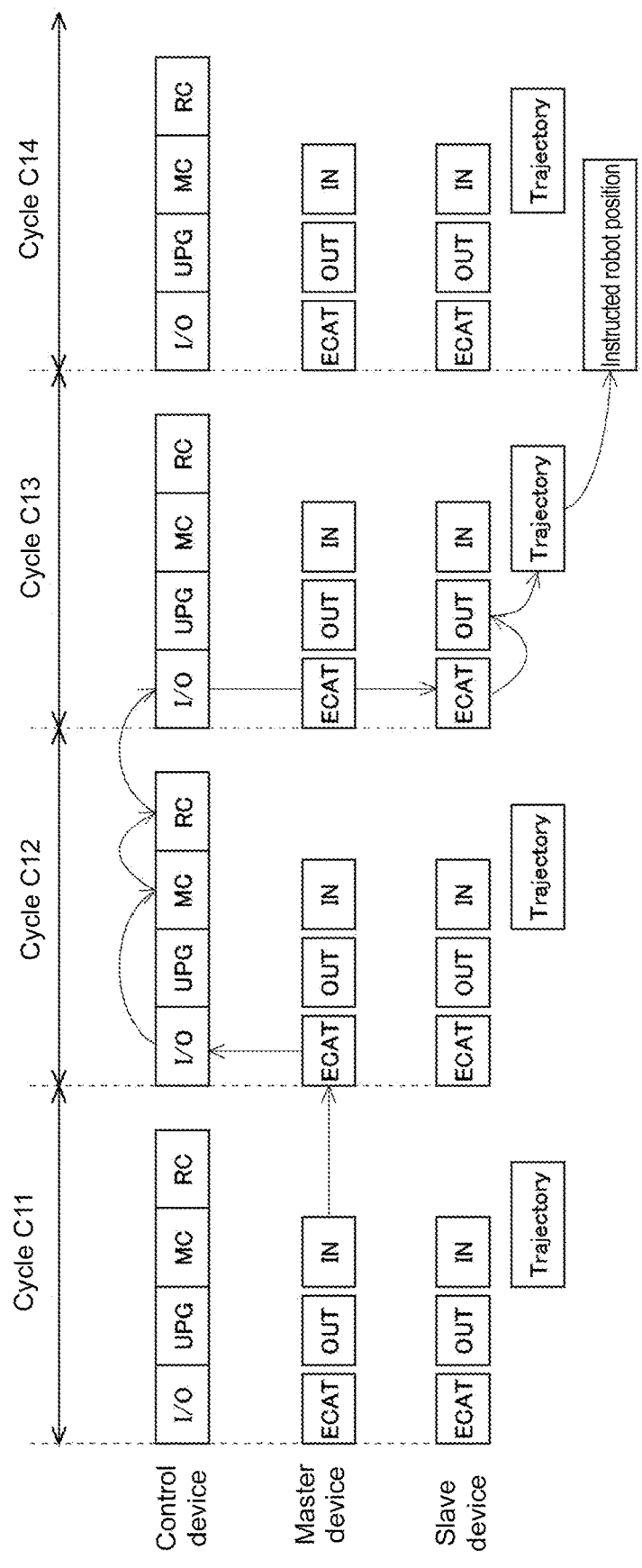
FIG. 6 is a diagram describing example communication between the control device and the field devices and an example delay in coordinated operations of the field devices.

FIG. 6 is a diagram describing example communication between the control device and the field devices and an example delay in coordinated operations of the field devices. FIG. 6 shows the processing performed by the control device and the field devices. The master device and the slave device shown in FIG. 6 are field devices. The master device corresponds to the operation master device, and the slave device corresponds to the operation slave device. The operation master device is the servo driver 220 that controls the motor 222. The operation slave device is the robot 210. I/O denotes input-output refresh, and corresponds to, for example, B60 in FIG. 3. UPG denotes execution of a user program. MC denotes computation for motion control, and corresponds to, for example, B42 in FIG. 3. RC denotes computation for robot control, and corresponds to, for example, B32 in FIG. 3. ECAT denotes communication with EtherCAT. For the field devices with EtherCAT, IN denotes input refresh, and OUT denotes output refresh. IN and OUT correspond to an input and an output to and from the Ethernet frame in FIG. 4. Trajectory denotes the calculation of a trajectory of the robot.

In cycle C11, data representing the current position is input at IN for the master device for feedback. In cycle C12, at ECAT for the master device and I/O for the control device, data is fed back to the control device 100. At MC and RC for the control device, control commands for the field devices are generated. In cycle C13, the control commands are transmitted at I/O for the control device and ECAT for the slave device and are read at OUT for the slave device. A trajectory of the operation of the robot 210 is calculated at Trajectory. In subsequent cycle C14, the robot 210 operates in accordance with the calculated trajectory. The processing for blocks other than the processing described above is also performed in parallel.

As shown in FIG. 6, the robot 210 operates in cycle C14, which is delayed from cycle C11, in which the servo driver 220 writes the current position for feedback, and cycle C12, in which command values are calculated through computation for motion control of the servo driver 220. Although not shown, the delay may vary depending on the combination of the types of the master device and the slave device, or more specifically, whether the master device is the servo driver or the robot, or the slave device is the servo driver or the robot. In other words, the communication cycle and the processing time vary depending on whether each of the operation master device and the operation slave device is a field device that operates in accordance with a program in an execution format in which the overall program is executed at every execution of the program, or a field device that operates in accordance with an intermediate code generated by the interpreter from at least a part of a program in an execution format in which parts of the program are executed successively. This causes the delay to vary. The estimator 70 corrects such a delay when calculating an estimated position.

The estimated position can be calculated using the position (current position) of the shaft of the motor 222 and its operating speed. For example, the estimated position may be determined using Formula 1 below.

$$\text{Estimated position} = \text{Current position} + (\text{current speed} \times \text{correction coefficient}) \qquad (1)$$

The current position may be a value fed back by the servo driver 220 or may be a command value in a control command to the servo driver 220. The current speed may be fed back by the servo driver 220 or may be calculated using a data row indicating current positions in past cycles. The correction coefficient is a predetermined value, and may be set in accordance with the combination of the types of the operation master device and the operation slave device. For example, the correction coefficient may be determined in association with the combination of the types of the operation master device and the operation slave device being a robot or a motor. Different correction coefficients may be used depending on whether the position fed back is used or the position indicated by the control command is used as the current position of the master device.

FIG. 7 is a table describing correction coefficients. The motion shaft or the shaft group corresponds to one or more motors, and is an example of a field device that operates in accordance with a program in an execution format in which the overall program is executed at every execution of the program. The robot is an example of a field device that operates in accordance with an intermediate code generated by the interpreter from at least a part of a program in an execution format in which parts of the program are executed successively. In the example in FIG. 7, the number of delayed cycles is determined for each combination of the types of the operation master device and the operation slave device. Different values are also determined depending on whether the position fed back is used or the position indicated by the control command is used as the current position of the master device. For the robot, different numbers of delayed cycles may be determined further depending on an amplifier in the robot. Different numbers of delayed cycles may also be determined depending on whether the robot 210 is controlled in accordance with one of the IEC program 51 and the application program 52 that are in different execution formats. The correction coefficients determined in accordance with delayed cycles as shown in FIG. 7 can be used to correct a communication delay, thus allowing synchronous control of the field devices. For example, the correction coefficients may be predetermined to be greater for a greater number of delayed cycles.

Correction Process

FIG. 8 is a flowchart of an example correction process. To generate and transmit control commands to field devices that are to operate in coordination, the control device 100 performs the process shown in FIG. 8. The estimator 70 first obtains the current position of the operation master device (S101 in FIG. 8). In this step, the current position may be a value fed back from the master device or may be a command value in a control command to the master device. For the master device being the robot, the current posture of the master device (combination of the positions of multiple motors included in the robot) may be obtained as the current position.

The estimator 70 then estimates a position expected to be reached by the master device (S102 in FIG. 8). In this step, the estimator 70 estimates a position expected to be reached by the master device at a time point at which the slave device performs the operation. The position expected to be reached can be calculated using Formula 1 above. In this step, the amount of correction may be changed depending on the combination of the types of the master device and the slave device, or on whether the current position of the master device is a value fed back from the master device or a value in a control command to the master device.

The motion processor 32 or the motion processor 42 determines, based on the estimated position expected to be reached, a command value for the slave device and transmits the value to the slave device (S103 in FIG. 8). In this step, the command value is determined to, for example, cause the slave device to operate using the position expected to be reached by the master device as a target. The slave device receives the control command containing the command value and operates in accordance with the command value.

The control device 100 determines whether to end the process (S104 in FIG. 8). In this step, the control device 100 determines, for example, whether the operations of the field devices in accordance with predetermined user programs have been performed. When the process is determined not to be ended (No in S104), the processing returns to S1 to continue the process. When the process is determined to be ended (Yes in S104), the control device 100 ends the process.

As described above, in a system that performs periodic communication, the control device 100 can correct delays in communication and operation that occur when a field device receives a control command based on the current position and operates. In particular, the control device 100 can execute the application program 52 and the IEC program 51 in a synchronized manner, and thus can correct delays in an integrated manner for the operation master device and the operation slave device being, for example, a motor and a robot in different execution formats.

Although the embodiment has been described above, the control device described above is a mere example, and the control device according to one or more aspects of the present invention is not limited to the above structure. The components described in the embodiment may be modified or combined in any possible manner without departing from the spirit and the technical idea of the present invention.

APPENDIX 1

A control device (100) for causing a plurality of field devices (210, 220) to operate in coordination with one another in accordance with a predetermined program through a network (2) allowing periodic communication, the control device (100) comprising:
- an estimator (70) configured to calculate, based on a position of a first field device in a first cycle, a position of the first field device operable in accordance with a first program in a second cycle following the first cycle; and
- a processor (32, 42) configured to determine, based on the first program, a first command value to cause the first field device to operate, to transmit the first command value to the first field device through an interface allowing communication with the plurality of field devices, to determine, based on the estimated position and a second program, a second command value to cause a second field device to operate in coordination with the first field device, and to transmit the second command value to the second field device through the interface (60).

REFERENCE SIGNS LIST 1 control system
2 field network
6 upper network
10 server
30 control application processor
40 IEC program processor
51 IEC program
52 application program
70 estimator
210 robot
220 servo driver
222 motor

The invention claimed is:

1. A control device for causing a plurality of field devices to operate in coordination with one another in accordance with a predetermined program through a network allowing periodic communication, the control device comprising:
   a processor configured to:
   calculate, based on a position of a first field device in a first cycle, a position of the first field device operable in accordance with a first program in a second cycle following the first cycle; and
   determine, based on the first program, a first command value to cause the first field device to operate, to transmit the first command value to the first field device through an interface allowing communication with the plurality of field devices, to determine, based on the calculated position of the first field device and a second program, a second command value to cause a second field device to operate in coordination with the first field device, and to transmit the second command value to the second field device through the interface, the first field device operating in accordance with the first command value, the second field device operating in accordance with the second command value,
   wherein the processor calculates the position of the first field device in the second cycle by adding, to the position of the first field device in the first cycle, a value determined by multiplying an operating speed of the first field device by a predetermined correction coefficient.

2. The control device according to claim 1, wherein
one of the first program or the second program is in a first execution format in which an overall program is executed at every execution, and another one of the first program or the second program is in a second execution format in which parts of the program are executed successively, and
the predetermined correction coefficient is determined in accordance with a combination of types of the first field device and the second field device, and the combination includes a device operable in accordance with the program in the first execution format and a device operable in accordance with the program in the second execution format.

3. The control device according to claim 2, wherein
the processor includes
a first processor configured to execute the program in the first execution format in every control cycle in the periodic communication and compute a command value to control one of the plurality of field devices, and
a second processor configured to execute the program in the second execution format and compute a command value to control another of the plurality of field devices in every control cycle in accordance with an intermediate code generated by an interpreter interpreting at least a part of the program in the second program, and to compute the command value to control the other of the plurality of field devices in response to the first processor executing the program in the first execution format, and
the first processor and the second processor each transmit the computed command value in every control cycle through the interface.

4. The control device according to claim 1, wherein
the position of the first field device in the first cycle is a feedback value fed back from the first field device or a command value transmitted to the first field device, and
the predetermined correction coefficient is determined in accordance with one of the feedback value or the transmitted command value to be used as the position of the first field device in the first cycle.

5. The control device according to claim 1, wherein
the periodic communication includes communication in accordance with an EtherCAT standard.

6. The control device according to claim 2, wherein
the position of the first field device in the first cycle is a feedback value fed back from the first field device or a command value transmitted to the first field device, and
the predetermined correction coefficient is determined in accordance with one of the feedback value or the transmitted command value to be used as the position of the first field device in the first cycle.

7. The control device according to claim 3, wherein
the position of the first field device in the first cycle is a feedback value fed back from the first field device or a command value transmitted to the first field device, and
the predetermined correction coefficient is determined in accordance with one of the feedback value or the transmitted command value to be used as the position of the first field device in the first cycle.

* * * * *